United States Patent [19]
Carnevale

[11] 3,799,477
[45] Mar. 26, 1974

[54] CROSS RUNWAY IMPACT PAD FOR AIRCRAFT ARRESTING SYSTEM

[75] Inventor: Umberto A. Carnevale, Wilmington, Del.

[73] Assignee: All American Industries, Inc., Wilmington, Del.

[22] Filed: June 14, 1972

[21] Appl. No.: 262,619

[52] U.S. Cl............................................ 244/110 C
[51] Int. Cl................................................ B64f 1/00
[58] Field of Search ........... 260/37 N, 858; 161/89, 161/190; 404/32, 35, 70; 244/114 R, 110 C, 110 R; 188/1 B

[56] References Cited
UNITED STATES PATENTS
2,844,340  7/1958  Daniels et al. .................. 244/110 C
3,582,446  1/1971  Stolki.................................... 161/89
3,158,341  11/1964  Green ............................ 244/110 C
3,607,600  9/1971  Schreter et al. ................ 161/190 X FOREIGN PATENTS OR APPLICATIONS
446,059  4/1936  Great Britain....................... 404/32

OTHER PUBLICATIONS
M. L. Nadler, "Liquid Adiprene Urethane Rubbers," Rubber World, July 1961, Pages 78–83 relied on.

Primary Examiner—George E. A. Halvosa
Assistant Examiner—Paul E. Sauberer
Attorney, Agent, or Firm—Connolly and Hutz

[57] ABSTRACT

A strip across an airport runway under the cross runway pendant of an aircraft arresting system is protected by an impact pad secured to the runway. The pad comprises a slab of a strong durable abrasion resistant elastomeric material, such as polyurethane, having imbedded in it an elastic network of a relatively stiff material, such as expanded or fabricated mesh of metal or synthetic having a coefficient of thermal expansion substantially matching that of the elastomer. The polyurethane has a low coefficient of restitution to damp vibrations and waves set up in the pendant or is resilient to suit the application. The pad is secured directly to the runway or on the removable lid of a covered channel installed under the cross runway pendant. The channel provides a depressed heated groove for receiving the pendant, drainage from equipment-containing pits to which it is connected, a conduit for electrical power supply and convenient access for maintenance. The impact pad is secured to the runway or lid by screws which engage the network at anchoring areas. The impact pad may include stress-absorbing cavities, such as slots on top and domed indentations below.

24 Claims, 12 Drawing Figures

Fig.6.
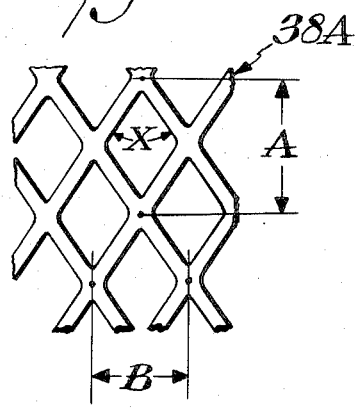
Fig.7.
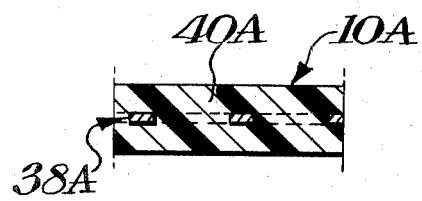
Fig.8.
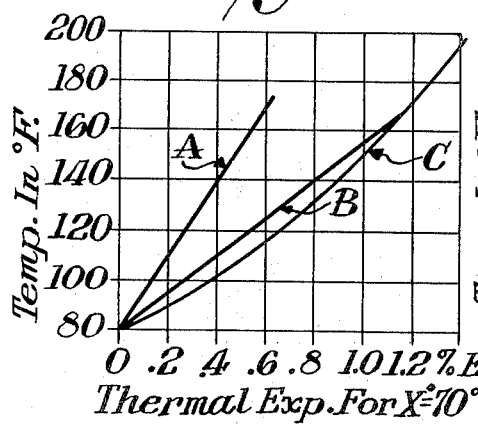
Thermal Exp. For X=70°
Fig.9.
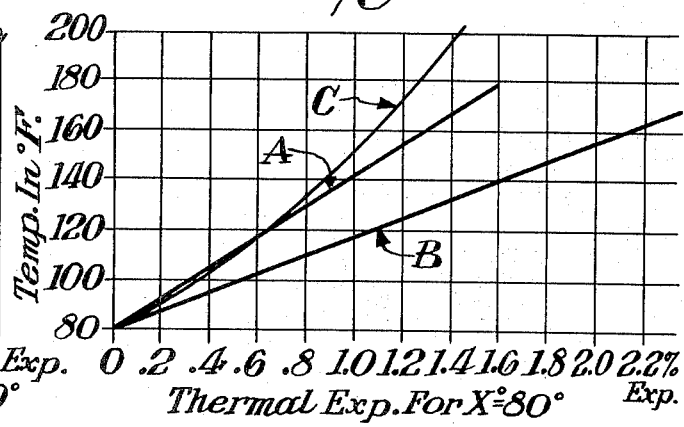
Thermal Exp. For X=80°
Fig.10. Fig.11.
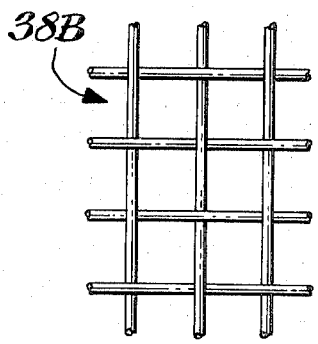
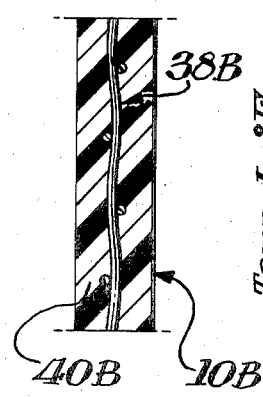
Fig.12.
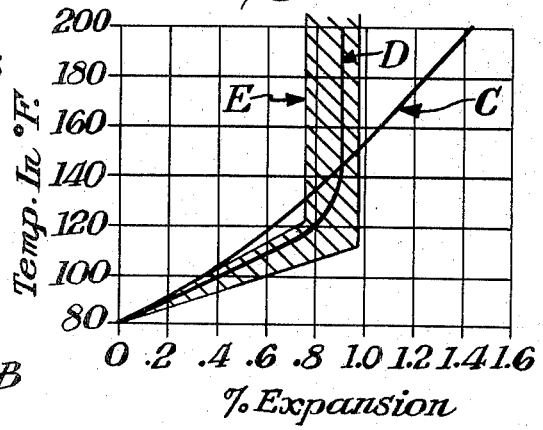
% Expansion 3,799,477

CROSS RUNWAY IMPACT PAD FOR AIRCRAFT ARRESTING SYSTEM

BACKGROUND OF THE INVENTION

The strip across an airport runway under the cross runway wire cable pendant of an aircraft arresting system is subjected to repeated impact when the pendant is overrun by normal unarrested aircraft traffic. The resultant wave motion and vibration of the pendant severely damages the concrete runway causing chipping, spalling, cavities and fractures. Polyurethane slabs bonded to steel base plates have been installed under the pendants to protect them from damage. The bonds between the slabs and base plates have, however, rapidly deteriorated in service causing the slabs to tear free of the plates and be destroyed. An object of this invention is to provide a durable impact pad for installation in an aircraft runway under an arresting system pendant.

SUMMARY

A strip across an airport runway under the cross runway pendant of an aircraft arresting system is protected by an impact pad secured to the runway. The pad comprises a slab of a strong durable abrasion resistant elastomeric material, such as polyurethane, having imbedded within it an elastic network of a relatively stiff material such as expanded or fabricated mesh of metal or synthetic, having a coefficient of thermal expansion substantially matched to that of the elastomer. The slab may have a low coefficient of restitution to damp vibrations and waves set up in the pendant or may be resilient to suit a particular application. The pad may be secured directly to the runway or on the removable lid of a covered channel installed under the cross runway pendant by cap screws which engage the base network at anchoring areas. The impact pad may include stress-absorbing cavities, such as slots in its top surface and domed indentations below. When the thermal expansion of the network matches that of the elastomer, they remain remarkably securely bonded to each and yield vastly longer service.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 6 is a plan view of a portion of an elastic network suitable for use in this invention;

FIG. 7 is a cross-sectional view of an embodiment of this invention incorporating the elastic network shown in FIG. 6;

FIG. 8 is a graph of the thermal expansion characteristics of the embodiment shown in FIG. 7 for one type of elastic network shown in FIG. 6 and for unreinforced polyurethane;

FIG. 9 is a graph of the thermal expansion characteristics of the embodiment shown in FIG. 7 for another type of elastic network shown in FIG. 6 and for unreinforced polyurethane;

FIG. 10 is a plan view of another type of elastic network suitable for use in conjunction with this invention;

FIG. 11 is a cross-sectional view of a further embodiment of this invention incorporating the elastic network shown in FIG. 10; and FIG. 12 is a graph of the thermal expansion characteristics of further embodiments of this invention of the type shown in FIG. 11 and for unreinforced polyurethane.

DESCRIPTION OF THE PREFERRED EMBODIMENTS

Figure 1:
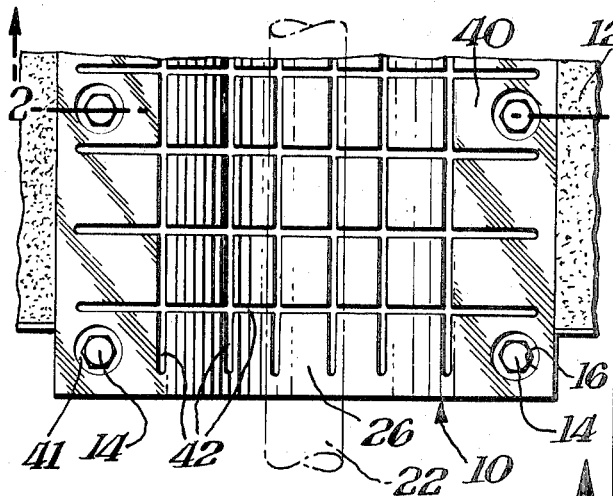
FIG. 1 is a top plan view of a portion of one embodiment of this invention secured to an airport runway.
Figure 2:
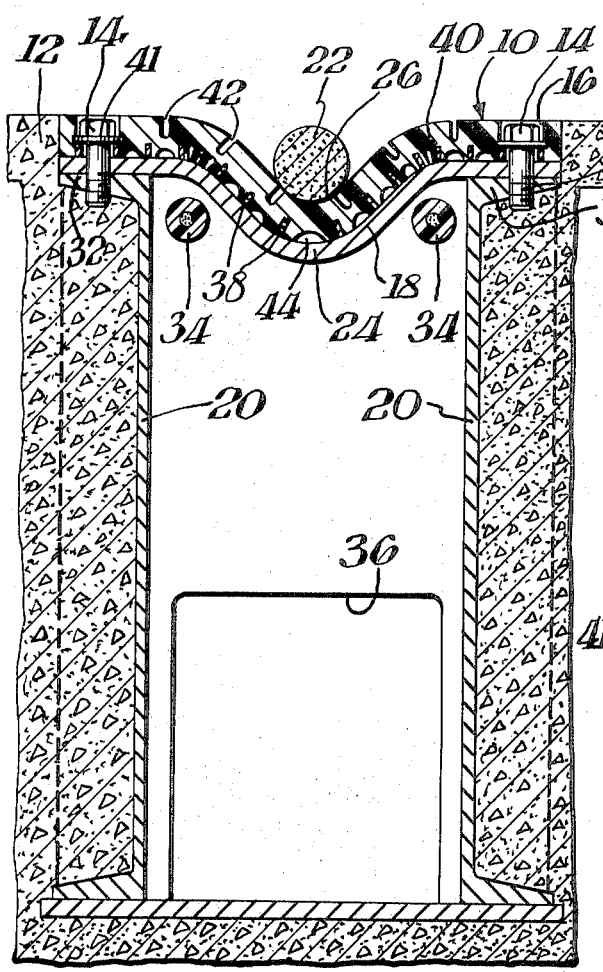
FIG. 2 is a cross-sectional view taken through FIG. 1 along the line 2—2.

In FIGS. 1 and 2 is shown an impact pad 10 secured to a portion of runway 12 by cap screws 14 extending through relieved or counterbored areas 16. As shown in FIG. 2, cap screws 14 secure pad 10 to longitudinally indented lid 18 covering channel 20 installed within runway 12 under cross runway pendant 22. Lid 18 is, for example, made of steel and includes longitudinal indentation 24. Pad 10 has a similar longitudinal indentation or groove 26 and its contour is formed to closely engage lid 18. Cap screws 14 pass through clearance holes 28 in lid 18 and into engagement with threaded holes 30 in top side flanges 32 of channel 20. Lid 18 and channel 20 are described in detail in commonly assigned copending U.S. Pat. application Ser. No. 225,083, filed Feb. 10, 1972 (AAE–7104–01A) and in commonly assigned copending U. S. Pat. application Ser. No. 201,350, filed Nov. 23, 1971. The aforementioned applications describe groove heaters 34 and drainage ports 36 in the walls of equipment containing pits (not fully illustrated).

Figure 3:
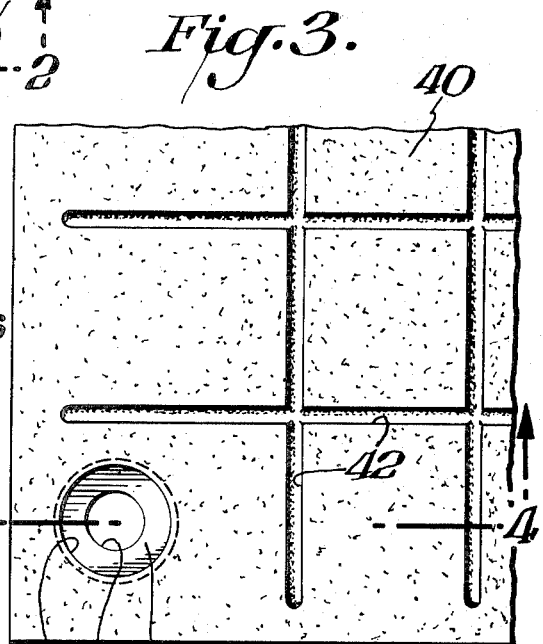
FIG. 3 is an enlarged top plan view of one corner of the embodiment shown in FIG. 1.
Figure 4:
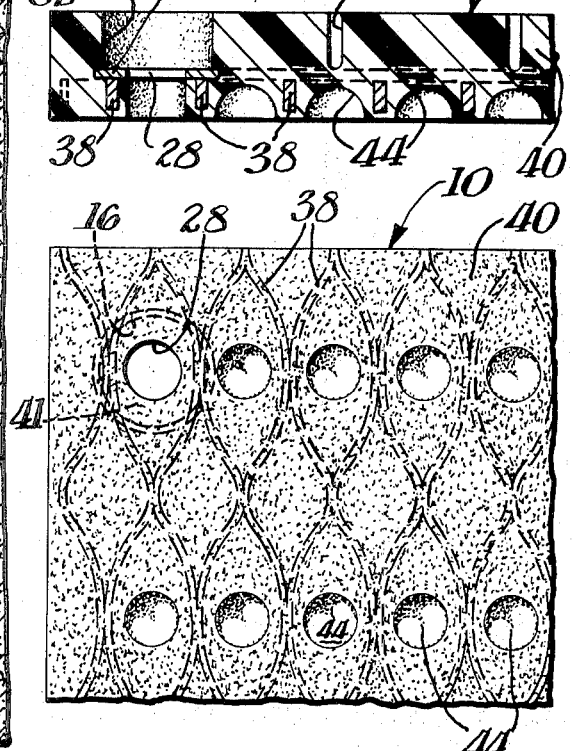
FIG. 4 is a cross-sectional view taken through FIG. 3 along the line 4—4.
Figure 5:
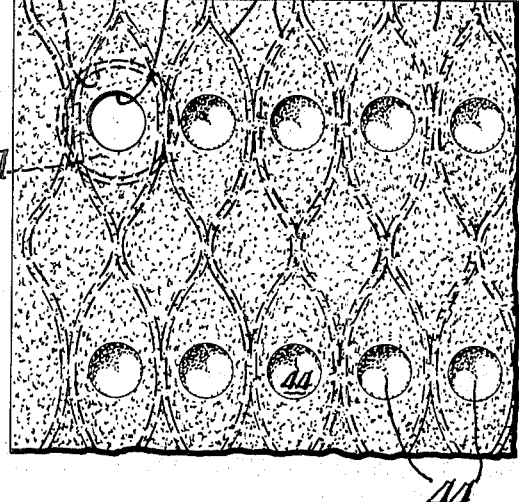
FIG. 5 is a bottom plan view of the corner shown in FIGS. 3 and 4.

As more clearly shown in FIGS. 3–5, pad 10 has an elastic network 38 imbedded in its base. Pad 10 comprises a slab 40 of a strong elastomeric material such as polyurethane and particularly advantageously a strong durable abrasion-resistant polyurethane having a low coefficient of restitution to damp vibrations and waves set up in pendant 22. Suitable low resilience polyurethane has the following characteristics and useful ranges:

1. Polymer — 6005 Polyurethane synthetic rubber from Uniroyal Chemical Company, Naugatuck, Connecticut 06771 – 100 parts by weight;
2. Curing Agent — 4.4 Methylene-bis-(2-chloroaniline)—95 parts by weight — Percent equivalent (theoretical) 95–98 percent;
3. Mixing Temperature — 212° F;
4. Curing Temperature & Time — 212° F. for 3 hours;
5. Hardness — 70 Durometer A, ranging from 68 to 95;
6. Tensile Strength — 6,000 pounds per square inch, ranging from 3,500 to 6,500;
7. Elongation at Break — 500 percent, ranging from 300 to 600;
8. Tear — 300 pounds ASTM-D-470; ranging from 60 to 350;
9. Impact Strength (IZOD, Notched) Flexed no fracture;

10. Abrasion Resistance, Labor H–18 Wheel — 1,000 gram weight/gram loss 1,000 revolutions — 0.018 ranging from 0.016 to 0.020; and 11. Resilience (Bashore) — 8 percent, ranging from 6 to 25 percent.

As previously mentioned, elastic network 38 is imbedded in the bottom portion of slab 40 and it provides a base for securing pad 10 to runway 12. Counterbored or relieved areas 16 through the top of slab 40 permit cap screws 14 to firmly engage against metal washers 41 imbedded within the bottom of counterbore 16 and in engagement with the top of network 38. Network 38 is for example an expanded metal such as steel, bronze or an aluminum alloy and thus provides an elastic, deformable but relatively firm base for securing pad 10 to runway 12. Network 38, is for example, expanded stainless steel having a thickness of 0.119 inch otherwise referred to as 11 gauge. It extends upwardly into slab 40 approximately one-third the thickness of slab 40. Slab 40 is for example about ⅜ inch thick and its thickness may also be advantageously increased up to about one-half inch. Network 38A has thermal expansion characteristics which substantially match the elastomer's with unexpectedly advantageous results as later described in conjunction with similar networks 38A and B.

Pad 10 and slab 40 may also include shock-absorbing cavities, such as slots 42 in the top of slab 40 and domed indentations 44 in the bottom of slab 40 between openings in expanded metal network 38. This composite structure helps the elastomer and base portions of pad 10 to deform and recoil together under shock, load or stress.

In FIG. 6 is shown an elastic network 38A suitable for incorporation in pad 10A shown in FIG. 7, which is similar to pad 10 in structure and function. The thermal expansion characteristics in two directions of a suitable network 38A are shown in FIGS. 8 and 9 in comparison to the thermal expansion characteristics of elastomer slab 40A.

FIG. 8 shows the thermal expansion characteristics of elastic network 38A in the A and B directions for an included angle "x" of 70°. FIG. 8 shows that the thermal expansion of network 38A in the A and B directions is substantially similar to the thermal expansion of the cast polyurethane utilized in slab 40A represented by the curve designated "C" in FIG. 8. This substantial similarity is maintained through temperatures ranging from 0° to 170° F., which well exceeds the range of temperatures normally encountered on an airport runway.

FIG. 9 shows the aforementioned substantial match is maintained when angle "x" is 80°—with the expansion varying from that of the cast polyurethane in the opposite direction from the results shown in FIG. 8. In FIG. 8 the thermal expansion in the A and B directions is slightly less than that of the polyurethane shown by curve "C," whereas in FIG. 9 the thermal expansion at a given temperature for network 38A in both the A and B directions is slightly greater than that shown for the cast polyurethane designated by curve "C." An optimum angle, "x," for network 38A would therefore be approximately 75°.

FIGS. 10 and 11 show another type of network 38B suitable for use in this invention imbedded in a cast polyurethane slab 40B consituting pad 10B. Network 38B is for examle made of steel or a preformed polyester mesh. The mesh spacing is for example 1-¼inch × 1-¼inch square. The gauge or thickness of the mesh is for example 0.070 inch to 0.120 inch for steel and the same for polyester. The thickness of slab 40B is for example three to four times the overall thickness of the mesh.

FIG. 12 shows the same thermal expansion curve "C" for the cast polyurethane in conjunction with curve "D" and dispersed data shaded area "E." Curve "D" pertains to a pad 10B incorporating network 38B of polyester mesh. Dispersed data area "E" relates to slab 40B with an elastic network 38B of steel wire mesh.

Both curves "D" and data area "E" substantially correspond to polyurethane curve "C" up to approximately 140° F. above which their expansion remains substantially constant. Since temperatures normally encountered on an airport runway very rarely exceed 140° F., the match for curves "D" and "E" is close enough to curve "C" for all practical purposes. Pads 10B with networks 38B of either polyurethane or steel mesh as described are therefore suitable for use in this invention.

The previously described substantial matching of the thermal expansion characteristics of networks 38, 38A and 38B to that of slabs 40, 40A and 40B makes pads 10, 10A, and 10B remarkably strong and resistant to the severe shock and temperature conditions to which it is subjected on an airport runway under a cross runway pendant. If the thermal expansion characteristics are not substantially matched, rupture nucleii commence forming within the pad before they are visibly apparent. Once these rupture nucleii form, the drastic shocks imposed by the wheels of the landing aircraft and the cross runway pendant cause the internal ruptures to rapidly progress to stripping and failure. The thermal matching as well as the elasticity of the internal networks therefore remarkably preserve the pads for greatly extended service life.

I claim:

1. An impact pad for protecting the portion of an airport runway under the cross runway pendant of an aircraft arresting system comprising a slab of a strong elastomeric material, an elastic network of a relatively stiff material imbedded in said slab whereby an elastic bond is formed with said slab, said network helping to secure said pad to said runway and maintaining it in protective contact upon said runway, and the thermal expansion characteristics of said network and elastomer being substantially matched whereby said pad is made remarkably strong and durable.

2. An impact pad as set forth in claim 1 wherein said pad ranges in thickness from about ⅜ inch to 1-½ inch.

3. An impact pad as set forth in claim 1 wherein said network comprises an expanded metal.

4. An impact pad as set forth in claim 3 wherein said expanded metal comprises steel.

5. An impact pad as set forth in claim 3 wherein said expanded metal comprises bronze.

6. An impact pad as set forth in claim 3 wherein said expanded metal comprises an aluminum alloy.

7. An impact pad as set forth in claim 1 wherein said slab includes cavities whereby compression stresses in said pad are reduced.

8. An impact pad as set forth in claim 7 wherein said cavities include slots in the upper portion of said pad.

9. An impact pad as set forth in claim 8 wherein said cavities also include indentations in the lower portion of said slab between said network.

10. An impact pad as set forth in claim 9 wherein said indentations are substantially domed.

11. An impact pad as set forth in claim 1 wherein said slab is relieved adjacent edges of said pad to expose said network from above to provide anchoring areas, and holes are provided through said pad at said anchoring areas for insertion of fasteners to secure said pad to said runway.

12. An impact pad as set forth in claim 1 wherein said pad includes a longitudinal indentation for receiving said pendant.

13. An impact pad as set forth in claim 1 wherein said slab comprises a material having a low coefficient of restitution.

14. An impact pad as set forth in claim 13 wherein said slab comprises polyurethane having a low resilience and high abrasion resistance.

15. An impact pad as set forth in claim 14 wherein said network is an expanded metal.

16. An impact pad as set forth in claim 15 wherein said polyurethane has a resilience (Bashore) ranging approximately from 6 to 25 percent.

17. An impact pad as set forth in claim 1 in combination with a removable metal plate secured to said runway, and fasteners securing said pad and plate to said runway.

18. An impact pad as set forth in claim 1 wherein said elastomeric material has a hardness ranging from about 68 to 95 Durometer A, a tensile strength ranging from about 3,500 to 6,500 p.s.i. an elongation at break ranging from 300 to 600 percent, tear strength ranging from about 60 to 350 lbs., high abrasion resistance, high impact strength and resilience (Bashore) ranging from about 6 to 25 percent.

19. An impact pad as set forth in claim 18 wherein said elastomeric material is polyurethane.

20. An impact pad as set forth in claim 19 wherein said elastic network comprises an expanded metal.

21. An impact pad as set forth in claim 3 wherein an included angle of said elastic network ranges approximately from 70° to 80°.

22. An impact pad as set forth in claim 1 wherein said elastic network comprises a preformed mesh.

23. An impact pad as set forth in claim 22 wherein said preformed wire mesh comprises a steel wire mesh.

24. An impact pad as set forth in claim 22 wherein said elastic network comprises a polyester fiber mesh.

\* \* \* \* \*